US006304579B1

(12) United States Patent
Malik

(10) Patent No.: US 6,304,579 B1
(45) Date of Patent: Oct. 16, 2001

(54) METHOD AND APPARATUS FOR SENDING A 1×N COMMUNICATION MESSAGE

(75) Inventor: Naeem Iqbal Malik, Fremont, CA (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/110,078

(22) Filed: Jul. 2, 1998

(51) Int. Cl.[7] .................... H04L 12/56; H04M 3/42
(52) U.S. Cl. .................... 370/432; 370/390; 379/201
(58) Field of Search .................... 370/218, 261, 370/388, 408, 390, 413, 432, 496, 466, 389, 257, 397, 412, 338, 400; 375/118; 379/201, 90.01; 709/223, 203

(56) References Cited

U.S. PATENT DOCUMENTS

| | | | |
|---|---|---|---|
| 4,991,171 | * 2/1991 | Teraslinna et al. | 370/388 |
| 5,103,444 | * 4/1992 | Leung et al. | 370/432 |
| 5,138,614 | * 8/1992 | Baumgartner et al. | 370/261 |
| 5,592,476 | * 1/1997 | Calamvokis et al. | 370/390 |
| 5,602,841 | * 2/1997 | Lebizay et al. | 370/413 |
| 5,933,412 | * 8/1999 | Choudhury et al. | 370/218 |
| 5,963,553 | * 10/1999 | Wicklund | 370/390 |
| 6,144,661 | * 11/2000 | KaTsube et al. | 370/390 |

OTHER PUBLICATIONS

Minzer and Spears, "New Direction in Signaling for Broadband ISDN", IEEE, pp. 6–14, Feb. 1989.*
MInzer, "Broadband ISDN and Asynchronous Transfer Mode (ATM)", IEEE, pp. 17–57, Sep. 1989.*

\* cited by examiner

*Primary Examiner*—Hassan Kizou
*Assistant Examiner*—John Pezzlo
(74) *Attorney, Agent, or Firm*—Oblon, Spivak, McClelland, Maier & Neustadt, P.C.

(57) ABSTRACT

A method and apparatus in a computer network system form a setup message at a source terminal. The setup message includes a 1×N extension message that identifies N different destination facilities, as identified by an operator, to which a data message is to be sent. The source terminal relays the setup message to a 1×N switch, where the 1×N switch invokes a 1×N extension mechanism that coordinates the establishment of communication links with the N different destination facilities identified in the setup message. For the destination facilities that have at least one communication link available thereto, the 1×N extension mechanism sends the data message to the available destination facilities at the same time.

23 Claims, 12 Drawing Sheets

METHOD AND APPARATUS FOR SENDING A 1×N COMMUNICATION MESSAGE

CROSS-REFERENCE TO RELATED APPLICATIONS

This application contains subject matter related to that disclosed in commonly owned, co-pending application Ser. No. 08/841,655, filed on Apr. 30, 1997 entitled "A Method And Apparatus For Routing Data Information Conveyed In A Facsimile Message", co-pending application Ser. No. 08/955,353 filed on Oct. 21, 1997 entitled "Method And Apparatus For Establishing Optimized ISDN Communication Conditions", co-pending application Ser. No. 09/021566, filed Feb. 10, 1998, entitled "Method and Apparatus for Expanding Data Rate In An ISDN Communication System" the contents of each of which being incorporated herein by reference.

BACKGROUND OF THE INVENTION

1. Field of the Invention

The present invention pertains to communication systems and methods for communicating information from a source terminal to two or more destination terminals via an Integrated Services Digital Network (ISDN) network or other network. In particular, the present invention pertains to establishing over a source sub-link, e.g. an ISDN D channel, a communication link between a source terminal and multiple destination terminals via a modified a 1×N ("one by N") switch and multiple destination sub-links, such as separate ISDN B channels.

2. Discussion of the Background

Conventional facsimile devices communicate over the Public Switch Telephone Network (PSTN) using analog signals that are transmitted over conventional telephone lines. The source terminal (e.g., a facsimile device, computer with scanner and modem facilities, or another device that transmits and/or receives data) converts digital scanned information into a corresponding analog signal so the same may be sent over the PSTN telephone line, via a telephone switch facility, to the destination terminal. The source terminal receives the analog information and converts the analog information back into digital signals which form the basis of an image to be printed, perhaps on facsimile paper.

The Integrated Services Digital Network (ISDN) is emerging as a next generation worldwide public telecommunications network that will replace existing public switch telephone networks and provide a variety of services that are not offered by the PSTN. ISDN will allow the transmission of various types of data between various types of ISDN terminal equipment (TE).

A portion of the ISDN link between a source terminal and a central office, which has a switch facility, is referred to as a "digital pipe". A capacity of the pipe is generally discussed in terms of separate channels. In particular, a "basic access" digital pipe includes two B channels (basic channels) that each support 64 kbps signaling, and a D channel at 16 kbps. While the total bit rate of these three channels is 144 kbps, framing, synchronization and other overhead bits bring the total bit rate of a basic access link to 192 kbps. Furthermore, the B channels serve as separate communication channels such that the maximum data capacity, as viewed by the user, is 64 kbps per B channel, and 16 kbps for the D channel, not 192 kbps.

Conventionally, the function served by the ISDN D channel, is twofold. First, the D channel is used to establish and maintain signaling between the (customer provided equipment) CPE and the ISDN switch (operated by the telephone company). Thus, the D channel carries signaling information such as that required for dialing the telephone number of the destination terminal and making the connection between the source terminal and the destination terminal. A more complete description of the D channel as employed in narrowband and broadband ISDN, as well as ISDN terminal equipment, protocols, data rates, etc. is provided in the literature, for example in Stallings, W., "Data and Computer Communications", 5th Edition, Prentice Hall, 1997, pp 740–769 (hereinafter "Stallings") the contents of this book being incorporated herein by reference.

Other communication protocols are available as well for routing information from a source terminal to a destination terminal. These protocols include Frame Relay, Switch 56, asynchronous transfer mode (ATM), asynchronous digital subscriber line (ADSL), and digital subscriber line (DSL), which may serve as links to the source terminal's CPE and the destination terminal. A more complete description of Frame Relay and ATM protocols is provided in Stallings at page "301" to page "359".

FIG. 1 is a block diagram of a conventional ISDN-based system having a source facsimile 10 at a source facility 1 that communicates via an ISDN switch 22 to a destination facsimile 16 (or other type of destination terminal, such as a computer, ISDN equipped photocopier, etc.) in a destination facility 2. The destination facsimile 16 may, in turn, send the message to one or more subaddressees (Sub1, labeled as 16S1 in FIG. 1, to SubN, labeled as 16S2 in FIG. 1). The source facsimile 10 communicates via a terminal adapter 10A, shown as an internal device, although a separate external terminal adapter may be used as well. The terminal adapter 10A provides a protocol (physical layer and intermediate layer) conversion function for converting signal protocols such as V.35, RS-232, Universal Serial Bus (USB), IEEE 1394 (FireWire), etc. to an ISDN compliant protocol over a 4-wire interface.

The NT1 14 connects the source facilities 1, via a two-wire line 15, to a switching module 26 located at the ISDN switch 22. Alternatively, a second network termination (NT2) may be used at the source facility 1 between NT 1 and the terminal adapter 10A to provide a switching and concentration function, such as with a digital private branch exchange (PBX). Likewise, the NT1 may be replaced with a NT12 that performs the functions of both the NT 1 and NT2.

At the ISDN switch 22, the switching module 26 connects to a processor 24 and another switch module 28 via a bus 27, which allows digital commands and data to be passed between the respective switching modules 26 and 28, and the processor 24.

The equipment at the destination facility 2 may or may not be exactly similar to that of the source facilities 1. In the system shown at FIG. 1, the destination facility 2 is used as an example and includes the destination facsimile 16 having a terminal adapter 16A incorporated therein, which connects to another NT1 20 as shown. The subaddress systems 16S1 and 16S2 may be similarly configured, and are identified by respective subaddresses included in the message sent by the source facsimile 10. The NT1 20 connects to the switching module 28 in the ISDN switch 22, via another two-wire line 17 as shown. Thus the ISDN switch 22 connects to the source terminal 1 by a single communications link (line 15), and connects to the multiple subaddress systems 16S1 and 16S2 by another single communications link (line 17).

ISDN communications is based on a seven layer protocol stack, as explained in reference to FIG. A.5 of Stallings, for example. Control signaling is accomplished between the respective user-network interface and occurs at a third layer of the protocol stack (i.e., the "network"layer) and is named 1.451/Q.931. Thus, establishing and maintaining control signaling for a communication link established between the source facility 1 and the destination ISDN facility 2 and facility 3 is made through the D channel, and in particular, the ISDN network layer, data link layer and physical layer.

As appreciated by the present inventor, a user of the source terminal 1 can communicate to the separate subaddresses 16S1 to 16SN only if the link 17 is operational, and only if the NT1 20, terminal adapter 16A and destination facsimile 16 are operating properly, because these items are single points of failure for communicating to the separate subaddresses 16S1 to 16SN. Furthermore, the ISDN switch is not configured to send a message from the source facsimile 1 to multiple destination facilities 2, which are not connected by a common line 17. While, the ISDN may establish separate communication links to separate facilities, the establishment of these links is done on a per-request basis by the source facsimile, thereby requiring significant set-up time at the source facsimile 1, and incurring significant set-up cost.

FIG. 2 is a frame structure 200 of a transmission from the source facilities 1 to the ISDN switch 22, for an ISDN basic rate access. The frame structure 200 includes 48 bits that are transmitted in 250 $\mu$sec. Components of the frame structure 200 include framing bits, F, dc balancing bits, L, B channel bits for the first B channel (16 per frame), B1, B channel bits for the second B channel (16 bits per frame), B2, D channel bits (4 per frame), D, auxiliary framing bit, Fa. A more detailed description of the frame structure, as well as a corresponding frame structure for the frames sent from the ISDN switch 22 to the source facilities 1, is described in Stallings, pp 212–215.

A link access protocol (LAPD) D channel is defined for establishing particular LAPD frames that are exchanged between the subscriber equipment (either at the source facility 1 or at the destination facility 2) and the ISDN switch 22. The call control protocol I.45 1/Q.931 is used on the D channel to establish, maintain and terminate connections on B channels.

A feature of the Q931 standard (section 5.1.1) is a call request operation where a setup message may employ "en-bloc" sending parameters, that among other things, establish a broadcast message that is received by the destination facility and distributed thereby to the respective subaddressees to which the broadcast message is to be distributed. In this case, the switch 22 does nothing to distribute the message from the source facility 1 to the separate subaddressees 16S1 to 16SN, but rather places the burden on the destination terminal 2 to administrate the broadcasting of the message to the respective subaddressees 16S1 to 16SN over separate lines 18S1 to 18SN (FIG. 1).

Tokyo Denki University Publishing Office published a paper entitled, "Illustrated Description for Technologies of ISDN Terminals" that describes the following "broadcasting" type incoming call procedure:

"In the broadcasting type incoming call procedure, the call is received by the network using the group TEI and the set-up message from a terminal is simultaneously transmitted towards all the addressed terminals and only terminals that are ready for communications respond to the call. When a plurality of the responses are simultaneously made, the network determines the order of a first-come first-served basis."

As appreciated by the present inventor, the above-described approach places the burden on the destination terminal 2 to simultaneously route the message to several subaddressees 16S1 to 16SN. The subaddresses are included in the Terminal endpoint identifier (TEI) portion of the ISDN setup message. This approach does not address the situation where a single message is sent from the source facility 1 to the switch 22, and have the switch 22 establish N different communication links (i.e., a 1×N switch operation) for communicating the message to N different destination terminals, which may be located at different locations (e.g., different states or countries).

FIG. 3 illustrates the signaling sequence between the source facility 1 and the ISDN switch 22. In order to establish each B channel connection between the source facility 1 and the destination facility 2, an initial communication link must be established on the D channel between the source facility 1 and the destination facility 2. To this end, a series of messages is sent back and forth between the source facilities 1 and the ISDN switch 22. This communication between the source facilities 1 and ISDN switch 22 occurs on a continuing basis on the D channel, while communications are maintained between the source facilities 1 and destination facilities 2 on the B channel. As shown in FIG. 3, several different messages are sent between the source facilities 1 and ISDN switch 22 while the D channel is maintained. One of the types of messages, as previously discussed is a broadcast message, where the destination terminal 2 is responsible for interpreting the message and routing the data message sent on the B channel(s) to the subaddressees 16S1 to 16SN.

The direction of the arrows in FIG. 3 indicates a direction of communication between the source facilities 1 and the ISDN switch 22. The process for establishing a connection is initiated by the source facilities 1 by first sending a setup message, which may include a broadcast message. Particular features of the setup message will be discussed with respect to FIG. 4, however the purpose of the setup message is to provide general information regarding the request to connect to the ISDN switch 22 and the destination facility 2. Next, the ISDN switch 22 responds with a call proceeding message that indicates that call establishment has been initiated. Subsequently, the ISDN switch 22, sends a connect message that indicates call acceptance by the source facilities 1 and destination facilities 2.

The source facilities 1 then sends a connect acknowledge signal that indicates the user has been awarded the call. When the user wishes to disconnect a call, the user sends a disconnect message via the source facilities 1 to the ISDN switch 22, requesting connection clearing. In response, a release message is sent from the ISDN switch 22, indicating the intent to release the channel and call reference. In response the source facilities 1 issues a release complete message, indicating that the release of the channel and the call reference. Subsequently, the call and information flow through the B channel is terminated.

FIG. 4 shows the structure of a conventional ISDN D channel setup message. The setup message includes respective LAPD frames (e.g., 501, 503 . . . ) of different sizes (measured in octets). The message includes a flag frame 501 that is one octet in length, followed by a service access point identifier (SAPI) frame 503 having a command/response bit (CR) and address field extension bit (0). The SAPI frame 503 is joined with the terminal end point identifier (TEI) frame 505, each of which are one octet in length. A control frame 507, is one or two octets in length, and is followed by an information frame 509, which has a variable length between 0 and 128 octets. A frame check sequence frame 511 follows and occupies two octets in length. An end frame 513 serves as an end of setup message flag.

The SAPI frame 503 includes a first subfield "SAPI", that identifies a protocol layer-3 user, as well as subframes C/R and 0, that are used as a predetermined formatting feature of SAPI. The TEI frame 505, is used to provide a unique terminal end point identifier that is used to identify the user's equipment, and in the case of a broadcast message, includes subaddresses of the subaddressees 16S1 to 16SN. The control frame 507 defines the type of frame format that will be employed such as an information frame, supervisory frame, and unnumbered frame for example. The information frame 509, includes a variable number of octets varying from 0 to 128 and contains respective subfields that contain any sequence of bits that form an integral number of octets.

Thus, when a user wishes to send data to a destination, information in the information field is passed directly to the destination user without the ISDN switch deciphering the contents of the information. Following the information field 509, the frame check sequence 511 is included and forms an error-detection function by calculating a code from the remaining bits of the frame, exclusive of the flags. The normal code is a cyclical redundancy check code. Finally, the end flag frame 513, includes a specific code indicating the end of the setup message.

As appreciated by the present inventor, a limitation with the broadcast approach to sending a message to several subaddressees 16S1 to 16SN, is that the subaddressees 16S1 to 16SN must be connected to a central routing mechanism (e.g., the destination facilities 2, in FIG. 1), where the burden is placed on the central routing mechanism to receive the message and simultaneously send copies to the respective subaddressees 16S1 to 16SN. Meanwhile, the ISDN switch 22 merely performs a rudimentary 1×1 switch function that receives one incoming message (over line 15 in FIG. 1) and sends one outgoing message over line 17 (FIG. 1).

The present inventor also recognizes that a limitation with conventional systems and methods is that users of a source terminal may wish to send a common message to many destination terminals that are not connected to one another, but all are connected to a switch. Thus, if a first destination terminal is located in Chicago and a second is located in San Francisco, and the first and second destination terminals are not directly connected to one another, the sender must send multiple transmissions in order to have the message sent to both destination terminals. This is both time inefficient and costly to the use of the source facility.

A related limitation with existing systems, as presently appreciated, is that conventional voice and data switches, such as those employed in Frame Relay, Switch 56, ATM, ADSL, and DSL do not support the ability to send a single message from a source facility and have the switch automatically establish N different communications links, where each communication link interconnects the source facility and the respective destination facility.

SUMMARY OF THE INVENTION

An object of the present invention is to provide a method, apparatus and system that transmits a message via a switch to multiple locations that overcomes the above-described and other limitations of conventional devices, methods and systems. A brief description of selected aspects of the present invention is now presented with the understanding that a more complete explanation of the invention is provided in the "Description of the Preferred Embodiments" section of this document.

A source terminal forms a setup message that identifies multiple, N, destination locations, each of which are connected to a "1×N"(one by N) switch, or other "1×N" switch, via independent communication channels. The setup message includes addresses for the multiple destination addresses so that the 1×N switch can identify the separate addresses included in the setup message and proceed to determine whether the identified destination terminals are available for receiving the message via separate communication channels. In one embodiment, this coordination is performed by a 1×N ISDN switch using N ISDN D channels so the net cost to the user is minimized. Once the 1×N switch determines that at least a subset of the N destination terminals are available for receiving the message, the 1×N switch receives the message from the source terminal and transmits the same to the available destination terminals.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THF PREFERRED EMBODIMENTS

Figure 5:
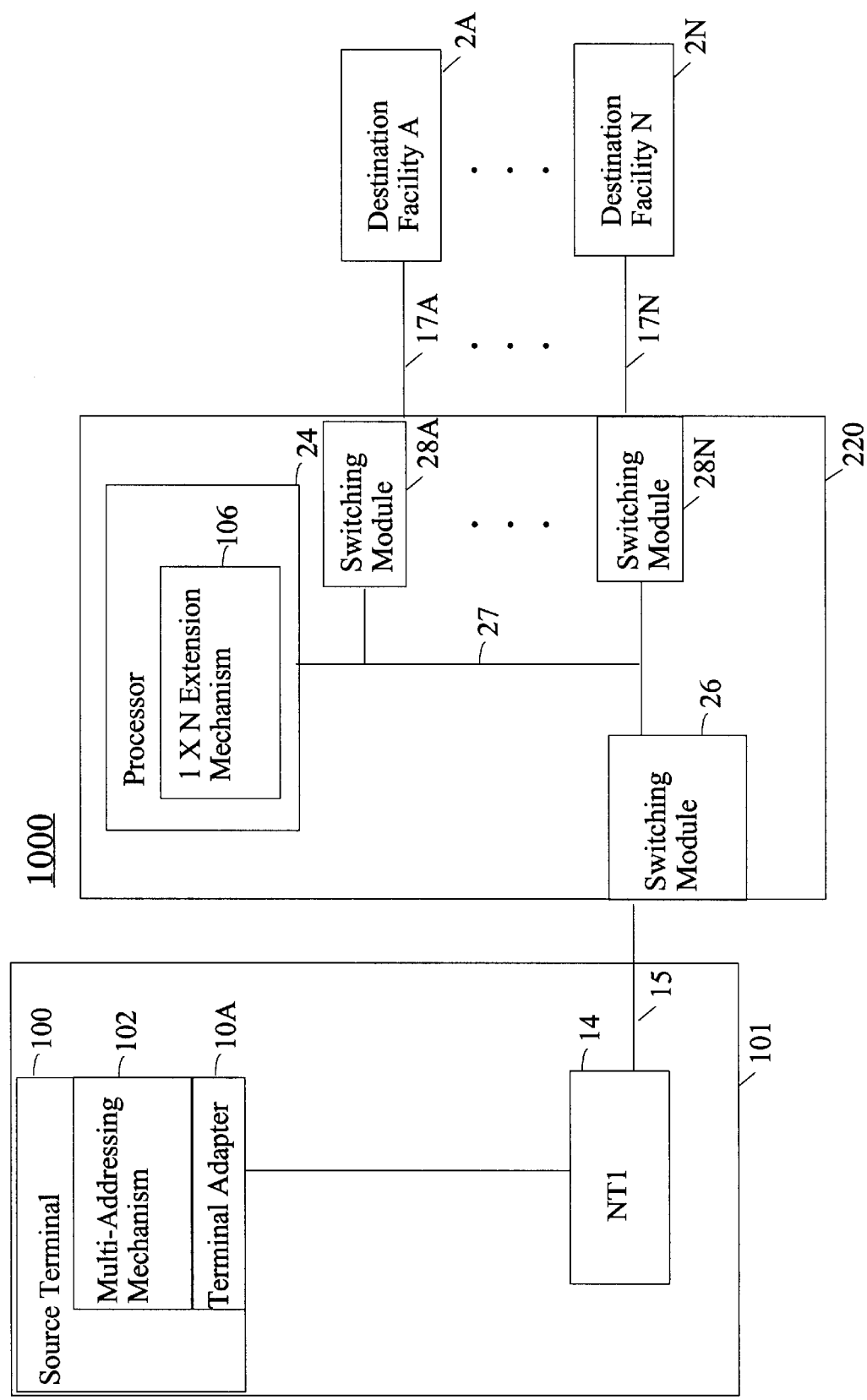
FIG. 5 is a block diagram of a 1×N-based switch system according to the present invention.

Referring now to the drawings, wherein like reference numerals designate identical or corresponding parts throughout the several views, and more particularly to FIG. 5 thereof, there is illustrated an Integrated Digital Service Network (ISDN) system 1000 in which a source terminal 100 of a source facility 101 communicates with multiple destination facilities 2A to 2N via an ISDN switch 220, modified to provide a 1×N switch function as will be explained. The source terminal 100 is included in the source facilities 101, located at a user site and is part of the customer provided equipment CPE. The source terminal 100 includes a multi-addressing mechanism 102 (as will be discussed), a terminal adapter 10A and network termination 1(NT1)14. Alternatively only a single NT1 is used at the source facilities 101 and at the respective destination facilities 2A to 2N. Connected to the NT1 14 is a two wire ISDN line 15 (a single communication link) that connects the source facilities 101 to the ISDN switch 220.

While the present embodiment is directed to an ISDN application, the present invention may be employed with other network configurations. For example, the present switch and switch based network may be incorporated into a frame relay system, a Switch 56 system, an asynchronous transfer mode (ATM) system, an asynchronous digital subscriber line (ADSL) system, for example. Furthermore, the present invention may be employed in a digital network of open bandwidths, in which the source terminal 101 communicates via a multilingual switch to multiple destination facilities, where the multiple destination facilities use network protocols that are different than that used at the source terminal. For example, the source terminal may use an ISDN line to connect to the digital network of open bandwidths switch, which recognizes and receives the information contained in the ISDN format, and sends a copy of the message to a first destination facility, which may communicate in a frame relay context. Similarly, another copy of the message may be sent to another destination facility, via an ATM network. The digital network of open bandwidths switch, which provides this translation function, communicates with the respective destination facilities in order to determine which communication protocols they support. Alternatively, the digital network of open bandwidths switch incorporates a memory, that holds an indicator that indicates which protocol is supported by the respective destination facilities.

In the present embodiment, the ISDN switch 220 includes a processor 24 (e.g., one or more discrete central processing units), with associated memory (e.g., RAM, ROM, and/or mass storage), interface devices, etc, switching modules 26, 28 and bus 27. An example of a suitable processor 24 with switching modules 26, 28A to 28N is the 5ESS SWITCH available from AT&T, although appropriately modified to include the 1×N extension mechanism 106 as will be discussed herein, and the multiple switching modules 28A to 28N. The switching modules 28A to 28N are connected via the bus 27 to the first switching module 26 and the processor 24. The switching modules 28A to 28N are also connected to respective two wire ISDN lines 17A to 17N, which in turn are connected to NT1s of the destination facilities 2A to 2N.

An example of the source terminal 100 or destination terminals 2A to 2N is a Ricoh FAX-4700L, which includes a G4 option, and Ricoh RS232PC-FAX expander, for example, appropriately modified to include multi-channel addressing mechanisms, preferably accomplished as a software configured processing device. The source terminal 100 is configured to send information to the destination terminal in various forms, such as facsimile images through the G4 facsimile convention, audio, video, or other digital signals that are compatible with ISDN.

The system 1000 begins operation by receiving at the source terminal 100 an indication from a user that the user wishes to send a common transmission to multiple of the destination facilities 2A–2N. Optionally, the source terminal 100 will not query the user, but will automatically recognize whether the user inputs multiple telephone numbers (e.g., addresses, or other identifiers for the respective destination facilities 2A–2N). In response, the multi-addressing mechanism 102 forms a setup message in memory that includes a 1×N extension mechanism. The source terminal 100 after forming the setup message, sends the setup message through the terminal adapter 10a, NT1 14 and to the ISDN switch 220 via the single link 15.

In response to receiving the setup message at the switch module 26, the ISDN switch 220 passes the message to the processor 24 by way of the bus 27. In the processor 24, a 1×N extension mechanism 106 identifies the multiple addresses in the setup message, or alternatively recognizes a flag indicating that the source terminal 100 would like to send a message to multiple destination terminals. The 1×N extension mechanism 106 stores an indication of the multi-address request in RAM, and initiates an initial investigation as to whether the respective destination facilities 2A–2N, have available to them open channels (for example, one of the 2 B channels) for receiving the 1×N extension message from the source terminal.

The 1×N extension mechanism 106 initiates the investigation by sending to the respective switching modules 28A–28N requests to issue a query mechanism to the respective destination facilities 2A–2N so as to determine whether respective destination facilities 2A–2N have an available B channel (or a partial B channel) for receiving the data message (such as a facsimile image) from the source terminal 100. Alternatively, the 1×N extension mechanism 106 and 1×N ISDN switch 220 monitor communication with respective destination facilities 2A–2N, so as to determine whether the respective destination facilities 2A–2N have available to them at least one fill B channel, or a fraction thereof. Alternatively, higher data rates may be achieved by combining two B channels for respective of the destination facilities 2A–2N, so that higher data rates may be supported for the 1×N extension mechanism for those facilities.

The 1×N extension mechanism 106 polls the respective switching modules 28A–28N, on a periodic basis, e.g., 10 milliseconds, for a total time period of up to 5 seconds, for example, so as to determine which of the respective destination facilities 2A–2N have a communication path available for receiving the data message from the source terminal 100. Based on the polling responses, the 1×N extension mechanism 106 communicates a status message via the bus 27 and switching module 26 to the source facilities 101, informing the source terminal 100 that one or more of the destination facilities 2A–2N are ready and available to receive the data message. In response, the source terminal 100 transmits the message via the processor 24 and to the respective switching modules 28–28N, in correspondence with the available destination facilities 2A–2N. If the links 17A–17N to all the destination facilities 2A–2N have a common bandwidth (e.g., 56K bps), then the processor 24 allows the source terminal 100 to route the message to each of the destination facilities 2A–2N at a common rate. However, if the processor 24 has determined that one or more of the destination facilities 2A–2N can only support a limited data rate via its communication link with the switch 220, then the processor 106 implements a store and forward option, where information of the message sent from the source terminal 100 is buffered in the 1×N extension mechanism 106 so that the slowest of the destination facilities 2A–2N may receive information from the processor 24 at the maximum rate it can handle. The switches 28A–28N themselves may serve as the store and forward hub so that coordination with the 1×N extension mechanism is kept to a minimum. Of the other available destination facilities 2A–2N that have a higher communications capacity, switching modules 28A–28N may extract copies of the message from the processor 24 at a rate commensurate with the channel capacity of the communication link the interconnects the respective destination facilities 2A–2N with the ISDN switch 220.

Alternatively, the source terminal 100 may serve as the repository for the data message until the 1×N extension mechanism 106 has determined that at least a subset of the destination facilities 2A–2N are available for receiving the data message. Once informed the source terminal 100 sends the data message over one or more B channels and the 1×N extension mechanism 106 places the message on the bus 27 where each of the relevant switching modules 28A–28N copy and send the message to the available destination facilities 2A–2N.

While the communication of the message itself is normally performed over one or more B channels, the coordination process between the switch 220 and the respective destination facilities 2A–2N is performed over respective D channels available to the destination facilities 2A–2N.

Figure 6:
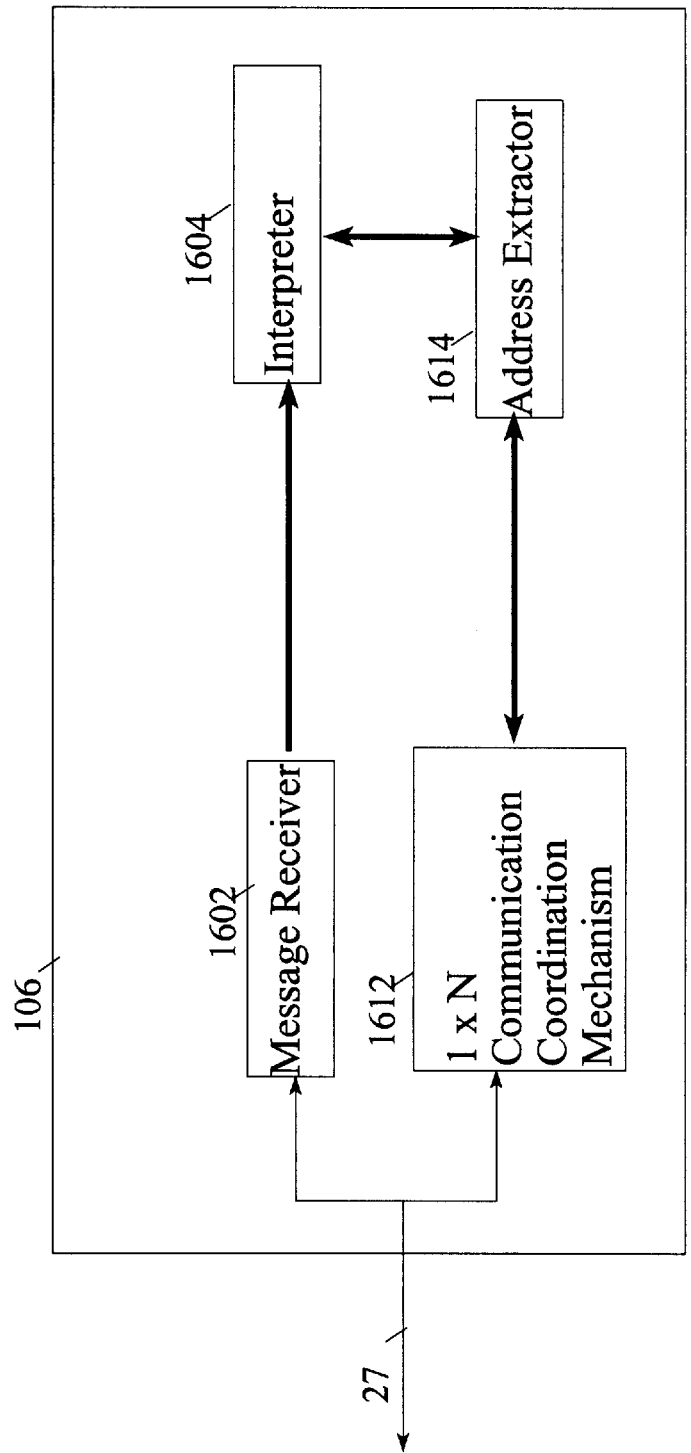
FIG. 6 is a block diagram of a 1×N extension mechanism employed by the 1×N switch according to the present invention.

FIG. 6 is a block diagram showing several mechanisms included in the 1×N extension mechanism 106. A message receiver 1602 receives the 1×N extension message sent from the source terminal 100 and stores the same in memory. The message receiver 1602 passes a "1×N coordination message" portion of the message (as will be explained with respect to FIG. 9) to the interpreter 1604. The interpreter 1604 determines the number of destination facilities requested by the source terminal 100, and informs the address extractor 1614 of the number of destination facilities targeted to receive the message.

The address extractor 1614 then extracts a particular address (such as a telephone number) for each of the destination facilities recognized by the interpreter 1604. Once each of the addresses is extracted by the address extractor 1614, the address extractor 1641 provides the addresses to the 1×N communication coordination mechanism 1612. The 1×N communication coordination mechanism 1612 then sends respective query messages to the switching modules 28A–28N that correspond with the destination facilities identified by the addresses extracted by the address extractor 1641. These corresponding switching modules 28A–28N format and send the query requests to the respective destination facilities 2A–2N, asking whether these destination facilities 2A–2N have communication link (s) available for receiving the data message from the source terminal 100. The respective destination facilities 2A–2N respond when a link is available.

After a predetermined period of time, such as 10 millisecond time intervals, the 1×N extension mechanism 106 polls respective of the switching modules 28A–28N over the bus 27 regarding the status of the destination facilities 2A–2N. If after a predetermined number of polling intervals, such as 500, not all of the switching modules 28A–28N have indicated that a communication link is available, the 1×N communication coordination mechanism notes in memory those destination facilities for which the message could not be routed at this time, and informs the source terminal 100 in the status message. This status message includes the addresses of the destination facilities that did not receive the message and reports the same via the bus 27 through the switching module 26 to the source facilities 101. In this way, the source terminal 100 is informed that the message has only been partially sent. In the store and forward alternative, the processor 24 then sends the data message to the available destination terminals 2A–2B, and in another alternative, the source terminal sends the data message to the 1×N switch 220 after receiving the status message so the 1×N switch 220 can relay the data message to the available destination facilities 2A–2N.

Optionally, the 1×N communication coordination mechanism 1612 waits for a predetermined period of time, such as 10 minutes, and then reestablishes the process for routing the message to those destination terminals 2A–2N that were not previously available to receive the data message. This periodic checking continues for a predetermined number of intervals (e.g., 20) before the process terminates, and the 1×N communication coordination mechanism 1612 informs the source terminal 100 that the message was not and will not be delivered to the subset of intended destination facilities. At this point, the source terminal 100 optionally includes an automated link reestablishment procedure that automatically contacts the switch 220 after a predetermined period of time and provides the switch 220 with another 1×N extension message, identifying the addresses of the destination facilities 2A–2N that were previously unavailable. The process then repeats.

Figure 7:
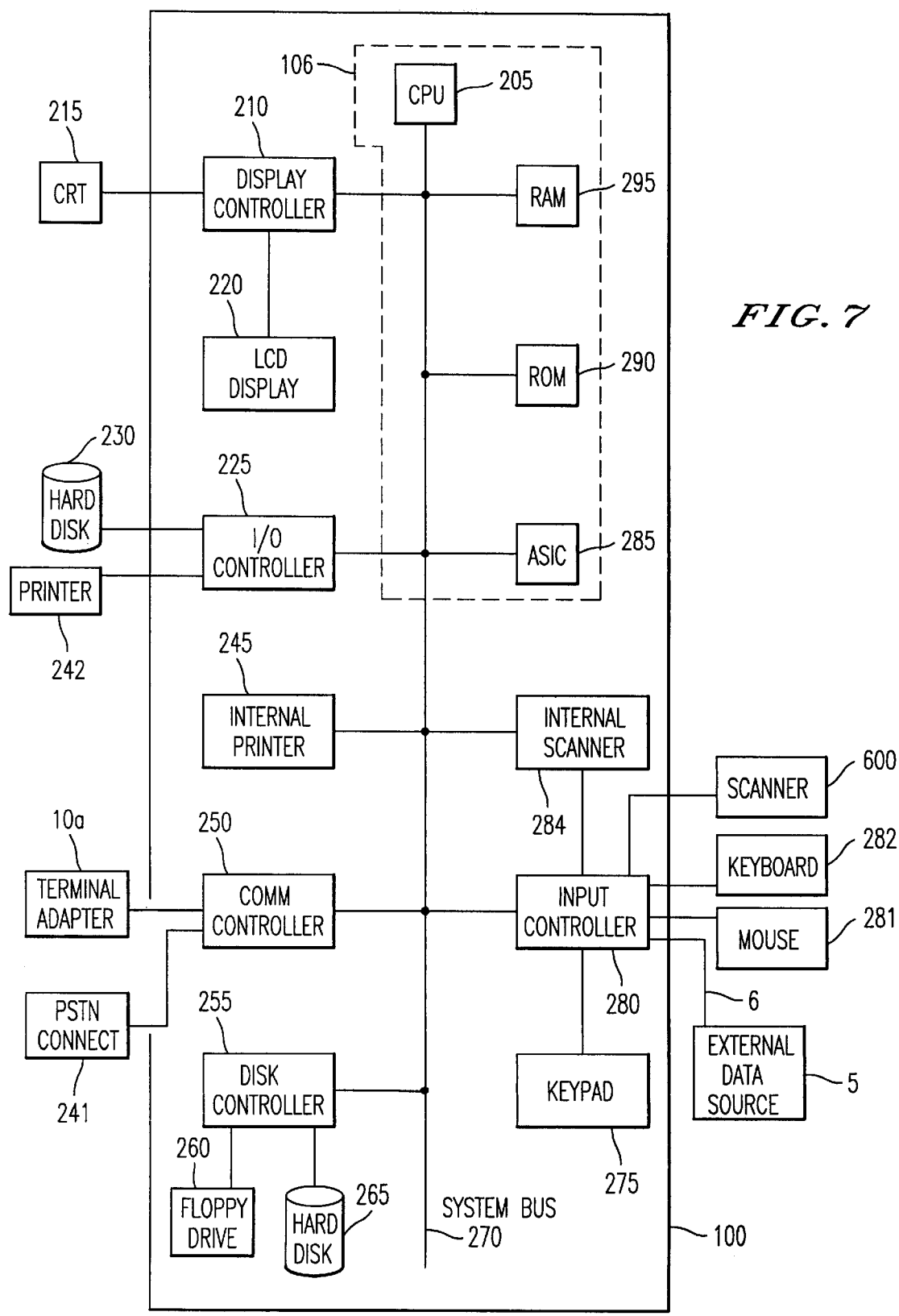
FIG. 7 is a block diagram of components included in a source or destination terminal.

FIG. 7 is a block diagram of an exemplary source terminal 100 according to the present invention. The terminals in the destination facilities 2A to 2N and the processor 24 in the 1×N switch 220 include similar components to that shown in FIG. 7. The source terminal 100 is connected to the terminal adapter 10A, which may be included internally or externally, and the terminal adapter 10A may also include brouter functions. The source terminal also connects to a PSTN connection 241, so that conventional communications may be sent over analog lines, if necessary. An external data source connection 5 is shown to connect to the source terminal 100 via an external interface 6, where the external data source 5 provides digital data or analog data (which is then digitized by the source terminal 100 with an analog to digital converter contained therein) to the source terminal 100 for inclusion in 1×N extension messages sent to the destination facilities 2A to 2N. The external data source may be any type of data source that would benefit from transferring data to a remote location. Examples of external data sources 5 include a printer, digital camcorder, digital camera, digital versatile disk (DVD), digital video (DV) recorder, CD player, digital telephone, computer and a photocopier.

The external interface 6 is a digital bus (e.g., serial or parallel) when the source terminal 100 receives digital data through a respective connector(s) formed therein. In particular, example external interfaces 6 include universal serial bus (USB), EIA-232, ISDN (ISO 8877), or IEEE 1394 ("Firewire") as described in Wickelgren, I., "The Facts About Firewire", IEEE Spectrum, April 1997, vol. 34, No. 4, pp 19–25, the contents of which are incorporated herein by reference. When receiving analog data, the external interface 6 is configured as a coaxial cable, a twisted pair, or an optical fiber (for example) as the source terminal 100 includes a respective connector for receiving the analog signals.

Because the source terminal 100 is configured to receive information from the external data source 5 via the external interface 6, the source terminal 10 provides a conventional facsimile function, albeit with a higher data rate capacity than conventional facsimile machine, and a significantly different function than conventional facsimile devices. In particular, the source terminal 10 of FIG. 7 also serves as a general purpose communications resource that is capable of transmitting data at a high data rate from various types of external data sources 5 to remote terminals. In a reciprocal manner, the source terminal 10 is equipped to receive data from another terminal (e.g., destination facility 2A) and provide the data to the external data source 5 for display thereon or for use therein.

The structure of the source terminal 100 as shown in FIG. 7, also suitably describes the general features of the processor 24 that would be employed in the modified ISDN switch 220, although appropriately adapted for an ISDN switch application as will be appreciated by one skilled in the ISDN art. A system bus 270 interconnects a variety of components that populate the system bus 270. A central processing unit (CPU) 205 executes software processes that provide general purpose control of the source terminal 100, and multi-address extension mechanism operations as well as bus administration functions for the system bus 270. The CPU 205 has available to it system random access memory (RAM) 295 for temporary storage of data. The non-volatile ROM 290 also holds the control program and fixed parameters. An application specific integrated circuit (ASIC) 295 is provided for performing specialized data manipulation functions, which could be adapted to serve as the entire multi-addressing mechanism 106, although in the present embodiment, most of the multi-addressing mechanism is performed in the CPU 205 by the execution of a multi-address software-based process. As shown, the multi-addressing mechanism 106 is identified by the dash line in FIG. 7 and includes the CPU 205, RAM 295, ROM 290, and ASIC 285. However, because the multi-addressing mechanism 106 is largely computer-based, a subset of the components shown in FIG. 7 or additional components may be included as part of the multi-addressing mechanism 106.

As an alternative to the ASIC 285, other data manipulation devices such as field programmable gate arrays (FPGA, not shown), programmable logic devices (PLD, not shown) and other processing units (such as digital signal processing chips, not shown), may also be used. Also available as system resources are a disk controller 25, which controls an internal floppy disk 250 and a hard disk 265, and an input/output (I/O) controller 225, which controls an external hard disk 230 and an external printer 242. Either the external printer 242 or an internal printer 245 may be used to print text and data files output by the source terminal 100.

An input controller 280 is included that controls the internal scanner 600, an optional external scanner 283, an external keyboard 282, an external mouse 281, and an internal keypad 275. Under control of the input controller 280, either the internal scanner 284 or the external scanner 283 may be used to capture an image of an object document and convert the image into a digital data stream that is passed through the input controller 280 to the system bus 270 for further processing. The input controller 280 also receives input from the keypad 275, which serves as a data input device for the source terminal 100, although the keypad 282 and the mouse 281 serve as alternative input devices.

The input controller 280 also provides the interface (at a connector formed thereon) to the external interface 6 which interconnects the external data source 5 to the source terminal 100. For supporting digital signals, the input controller 280 includes interface logic that supports a FireWire interface or another interface standard such as USB, if another interface is used. When analog signals are provided, the input controller 280 includes an analog to digital converter (ADC) and digital to analog converter (DAC) for converting the external signals between the analog and digital domains. Data that is input to the external interface 6 is passed over the system bus 270 and stored in the RAM 295, where the data is later used by the CPU 205 in preparing the 1×N extension message.

A display controller 210 is used to control either, or both, of an external cathode ray tube (CRT) display 215 and an internal liquid crystal display (LCD) 220. Other displayed formats would also be suitable, including plasma displays, an active and passive light emitting diode (LED) displays, etc. The displays 215 and 220, in tandem with the keypad 275, the keyboard 282, and the mouse 281, serve a user interface function.

A communications controller 250 also resides on the system bus 270 and connects to the terminal adapter 10A. As discussed previously, the communication controller 250, and outputs information to the terminal adapter 10A according to RS232, V.35 or other data communication arrangement. The connection to the PSTN, is a RJ-11 connection, although other connections are possible such as a second ISDN connection, via another terminal adapter, etc., or a wireless access provider connection, for example.

Figure 8:
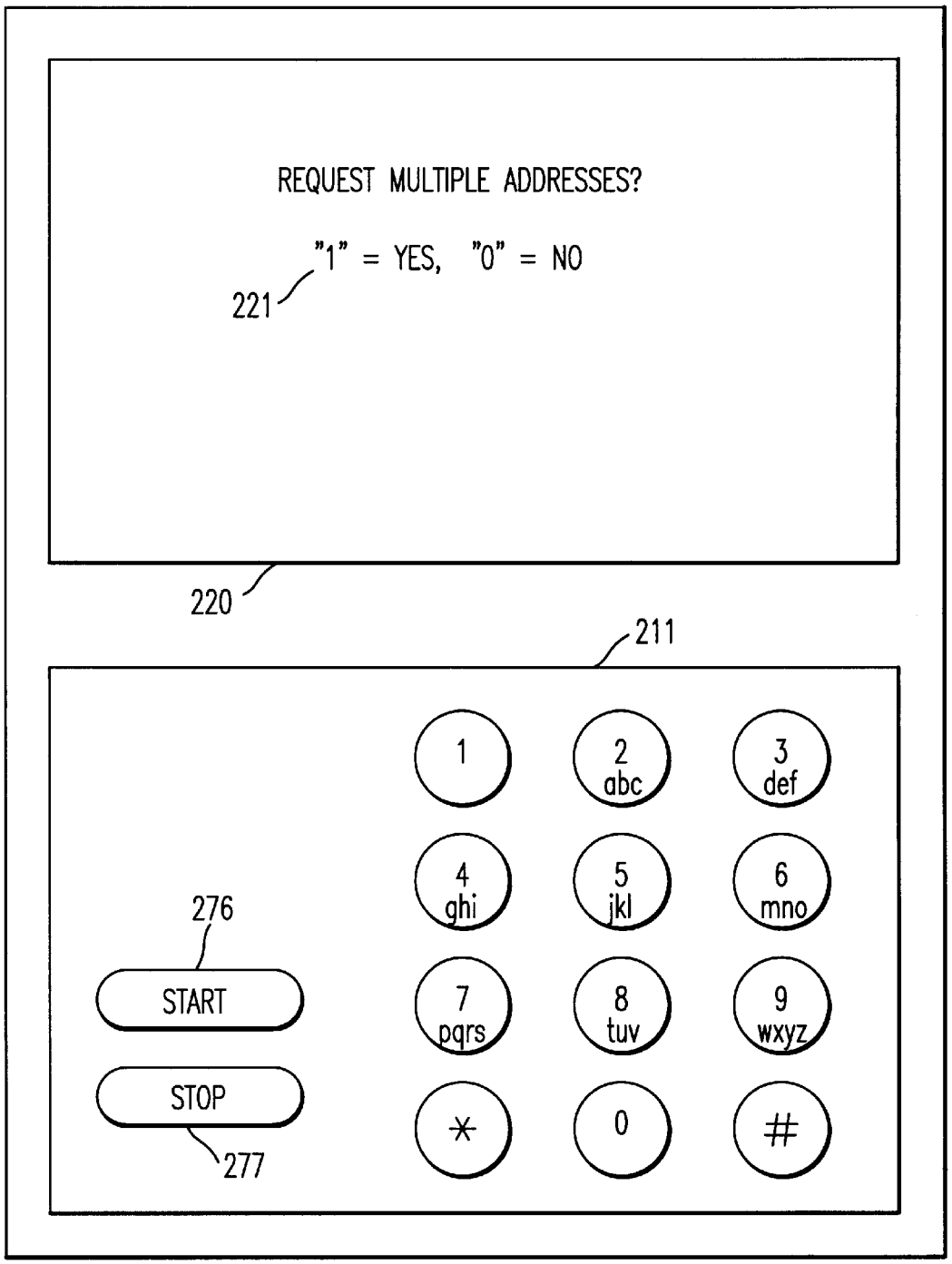
FIG. 8 is a plan view of a display and a keypad of the source terminal of FIG. 5.

FIG. 8 illustrates the display 220 and the keypad 275 of the source terminal 100. The keypad 275 includes a 12-digit numeric keypad, a "start" key 276 and a "stop" key 277. Data that is input by a user on the keyboard 275 is echoed (i.e., displayed) on the display 220 so that the user knows what the user entered at any given time. In addition, the display 220 also includes text, generated by the source terminal 100 that "prompts" the user to enter specific information at a specific time. For example in FIG. 8, the display 220 is prompting the user to enter a "1" if the user wishes to prepare a 1×N extension message, in which the user will be requested to provide the multiple addresses (such as separate telephone numbers) into the source terminal 100.

Figure 1:
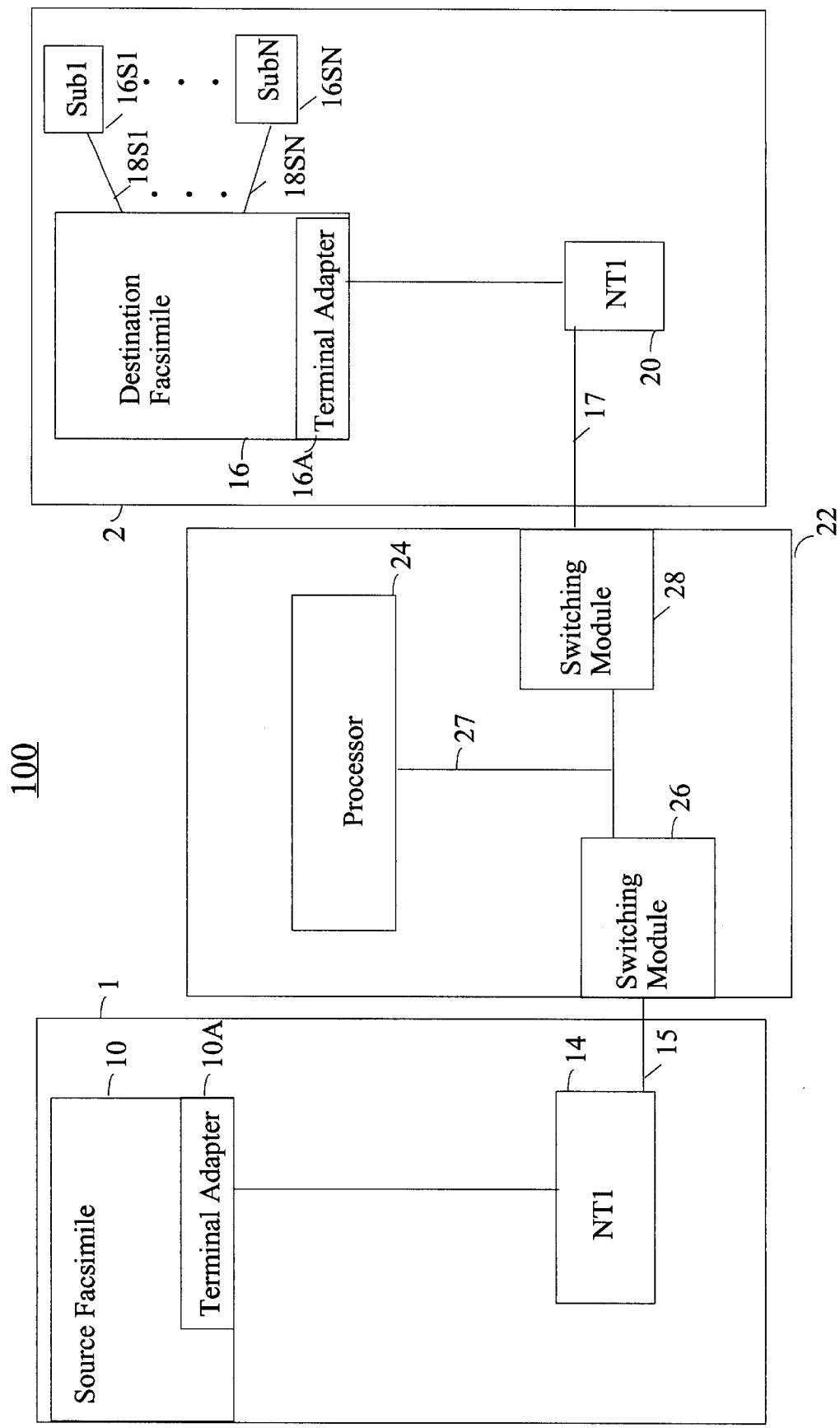
FIG. 1 is a block diagram of a conventional ISDN communication system with a broadcast feature.
Figure 2:
FIG. 2 is a conventional frame structure for communicating between a source terminal and an ISDN switch.
Figure 3:
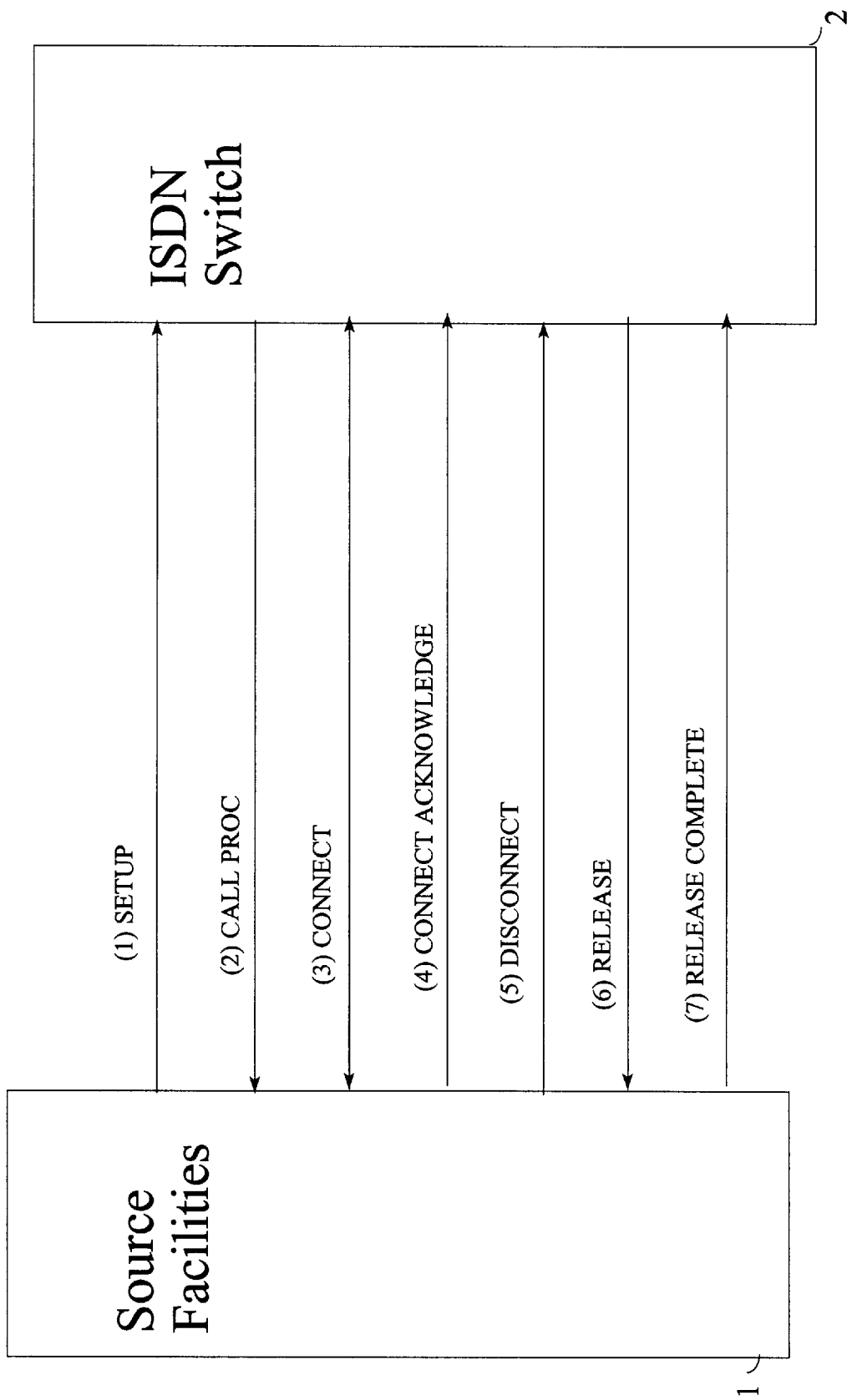
FIG. 3 is a conventional control signaling protocol for ISDN basic services.
Figure 4:
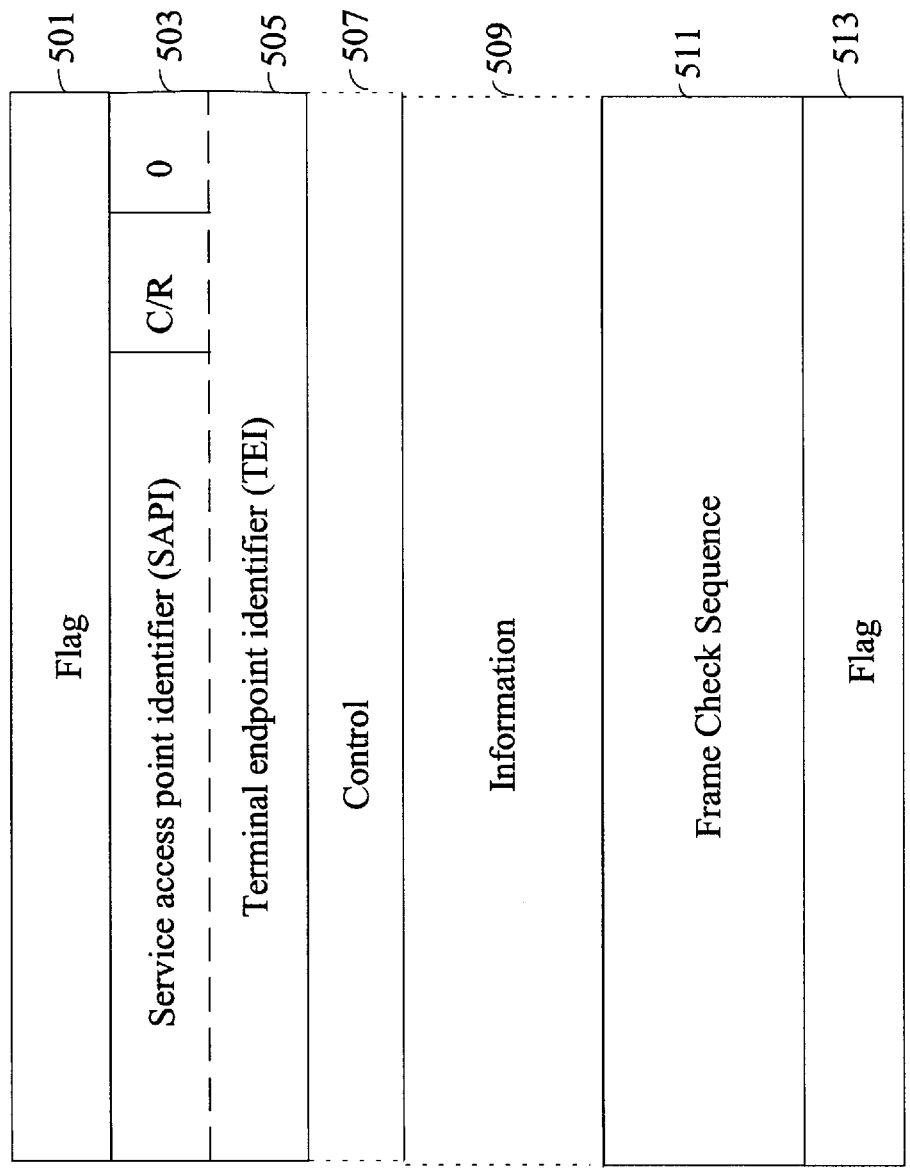
FIG. 4 is a conventional link access protocol, D channel message format for a setup message using an I.451/Q.931 message structure.
Figure 9:
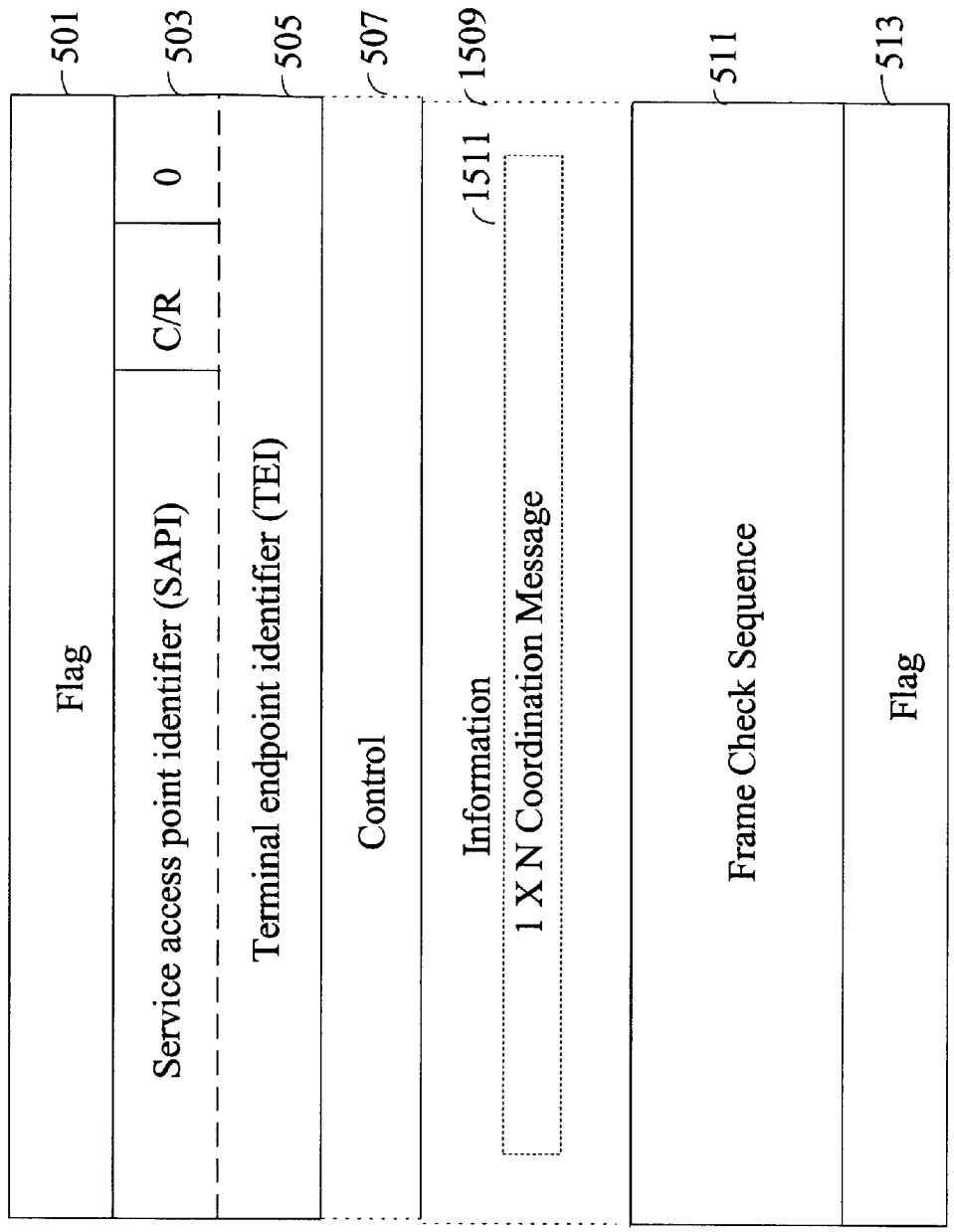
FIG. 9 is a modified link access protocol on the D channel (LAPD) setup message structure incorporating a 1×N coordination message according to the present invention.

FIG. 9 shows the LAPD frame structure for a setup message and includes a 1×N coordination message that is formed by the source terminal 100, stored in RAM 295, and subsequently sent via the system bus 270 to the terminal adapter 10A and then to the 1×N ISDN switch 220. A difference between the frame structure of that shown in FIG. 9 from that shown in FIG. 4, is that the information frame 1509 (of FIG. 9) includes 1×N coordination message 1511. 1×N coordination message 1511 includes an indicator field having a value indicative of the operator's response to the prompt shown in FIG. 8. When the setup message is sent to the 1×N ISDN switch 220, the processor 24 in the 1×N ISDN switch 220 then detects the presence of the value included in the indicator field.

If the indicator is detected, the processor 24 then extracts the respective addresses added at the source facilities 101 so as to determine which of the destination facilities 2A–2N are target recipients of the data message corresponding to the 1×N extension message. As was discussed with respect to FIG. 6, the 1×N extension mechanism 106 receives the 1×N coordination message, interprets the message in the interpreter 1604 and extracts the addresses in the address extractor 1641. In the 1×N communication coordination mechanism 1612, separate communications are made to the respective switching modules 28A–28N, regarding which of the destination facilities 2A–2N are available for communicating with the source terminal 100. Respective of the switching modules 28A–28N, send a query message to the respective destination facilities 2A–2N, querying whether the respective destination facilities 2A–2N have available thereto a communication line 17A–17N available for receiving the data message from the source facilities 101. If the respective destination facilities 2A–2N, inform the corresponding switching modules 28A–28N that a sufficient communication capacity through the lines 17A–17N is not available, then the switching module 28A stores a value therein in memory, for retrieval by the 1×N extension mechanism 106 when the 1×N extension mechanism 106 polls the respective switching modules 28A–28N. If the 1×N extension mechanism 106 determines that all of the address destination facilities 2A–2N are available to receive the data message, the 1×N extension mechanism 106 provides the message to the respective switching modules 28A–28N for simultaneous communication of the message to the respective destination facilities 2A–2N.

Alternatively, if a subset of the destination facilities 2A–2N are not available to receive the data message, then the 1×N extension mechanism 106 will wait a predetermined amount of time before performing a subsequent polling operation so as to determine which were previously unavailable destination facilities 2A–2N, are now available. Of course, if the previously unavailable destination facilities 2A–2N are now available, the 1×N extension mechanism 106 will then send the data message after determining each of the destination facilities 2A–2N are available to receive the data message. However, after performing a predetermined number of polling operations, and concluding that only a subset of the destination facilities 2A–2N are available to receive the 1×N extension message, the processor 24 will route the data message via the respective switching modules 28A–28N to the available destination facilities 2A–2N.

Optionally, the 1×N extension mechanism 106 will subsequently check with the respective switching modules 28A–28N for the previously unavailable destination facilities 2A–2N that did not receive the data message so that the message may be sent to these destination facilities. After sending the data message to one or more of the destination facilities 2A–2N, the 1×N extension mechanism 106 reports to the source facilities 101, that the message was sent to either a subset of the destination facilities 2A–2N, or the entire set of addressed destination facilities 2A–2N. Included in the status report message, the processor 24 informs the source facilities 101 of the respective addresses of the destination facilities 2A–2N that did not receive the 1×N extension message. Alternatively, the status message identifies the destination facilities 2A–2N that did in fact receive the extension message. In this way, the operator of the source terminal 100 will be informed of which of the addressed destination facilities 2A–2N received the 1×N extension message. At the operator's discretion, the operator may then initiate a subsequent operation to send a copy at a later time of the 1×N extension message to the respective destination facilities 2A–2N that did not originally receive the message. Alternatively, the source terminal 100 includes an automatic repeating mechanism that repeats the 1×N extension message for sending to those destination facilities 2A–2N that did not originally receive the message.

Alternatively, the 1×N extension mechanism 106 does not send the data message to the respective switching modules 28A–28N until either all of the address destination facilities 2A–2N reported that they are configured to receive the 1×N extension mechanism, or a predetermined subset of the destination facilities 2A–2N, as identified by the source terminal 100, are available. In this case, the 1×N extension mechanism 106 only sends the message if the all or the designated portion of destination facilities 2A–2N are available to receive the message, and otherwise informs the source terminal 100 that the 1×N extension message cannot be delivered to the addressed destination terminals 2A–2N.

As another alternative, the 1×N switch 220 does not hold the data message while initiating the communication links with the N destination terminals identified in the setup message, so as to minimize cost to the source terminal user if the data message is never sent.

In this alternative, the source terminal 100 waits to receive the status report message from the 1×N switch 220 before sending the data message to the 1×N switch 220.

Figure 10:
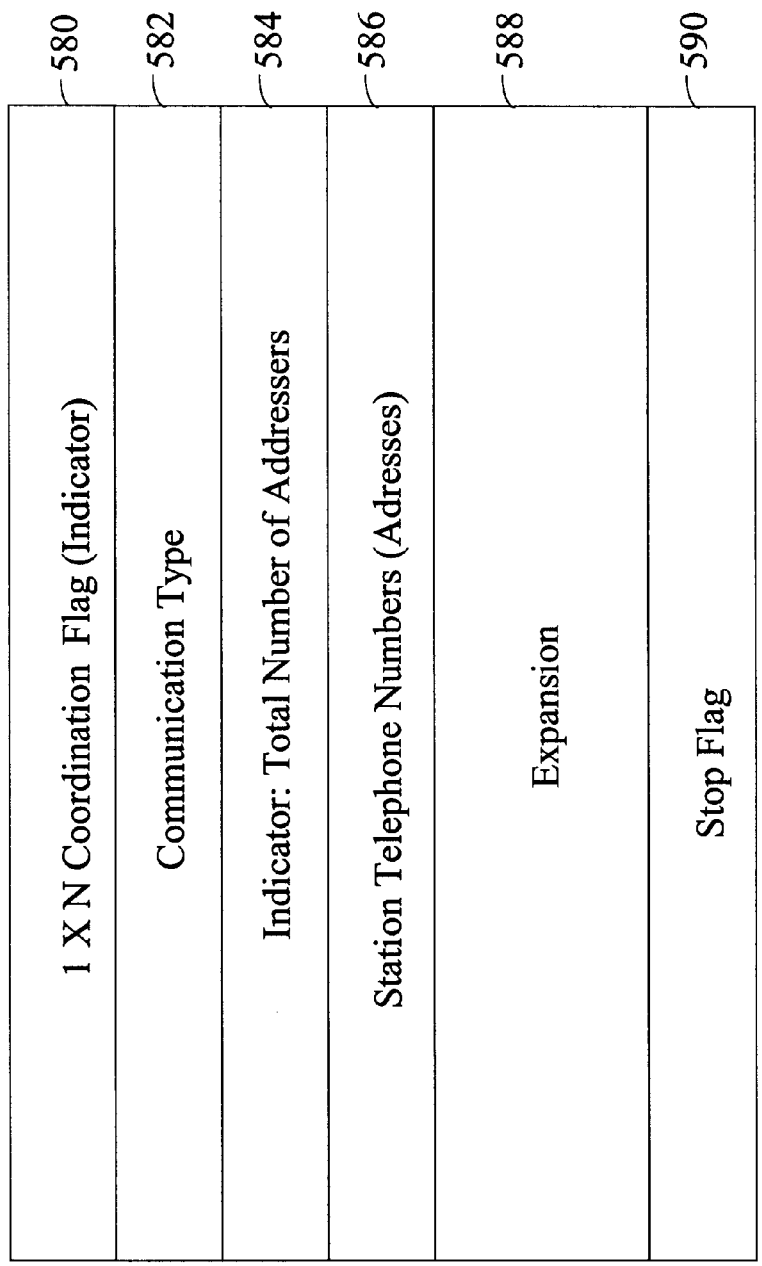
FIG. 10 is a block diagram of 1×N coordination message as shown in FIG. 9.

FIG. 10 shows exemplary frames employed in the 1×N coordination message 1511 as was shown in FIG. 9. The reply messages from the respective destination facilities 2A–2N are similarly structured. A 1×N coordination flag 580 is a first frame, and includes one octet, or alternatively multiple octet blocks, as will be discussed. The 1×N coordination flag 580 identifies a specific code-identifier (such as a string of pound-sign symbols) associated with sending a 1×N coordination message between the source terminal 100 and a subset of the destination terminals 2A–2N. Following the 1×N coordination flag 580 is a "communication type" frame 582, which indicates whether the present communication is a 1×N coordination message or not, and the type of message protocol being used by the source terminal 1. The message protocol indicator is of particular importance in the digital networks of open bandwidth embodiment of the switch, where the switch also performs a protocol conversion between the source terminal 100 and the respective destination facilities 2A–2N.

An indicator field 584 is provided that indicates the total number of addressees (i.e., identifications of destination facilities) included within the 1×N coordination message. In field 586, the individual station telephone numbers (or addresses, more generally) are included and delineated by predetermined characters such as the pound sign or asterisk. Extension field 588 is included for future capabilities, and the stop flag 590, indicates an end of the 1×N coordination message.

Figure 11:
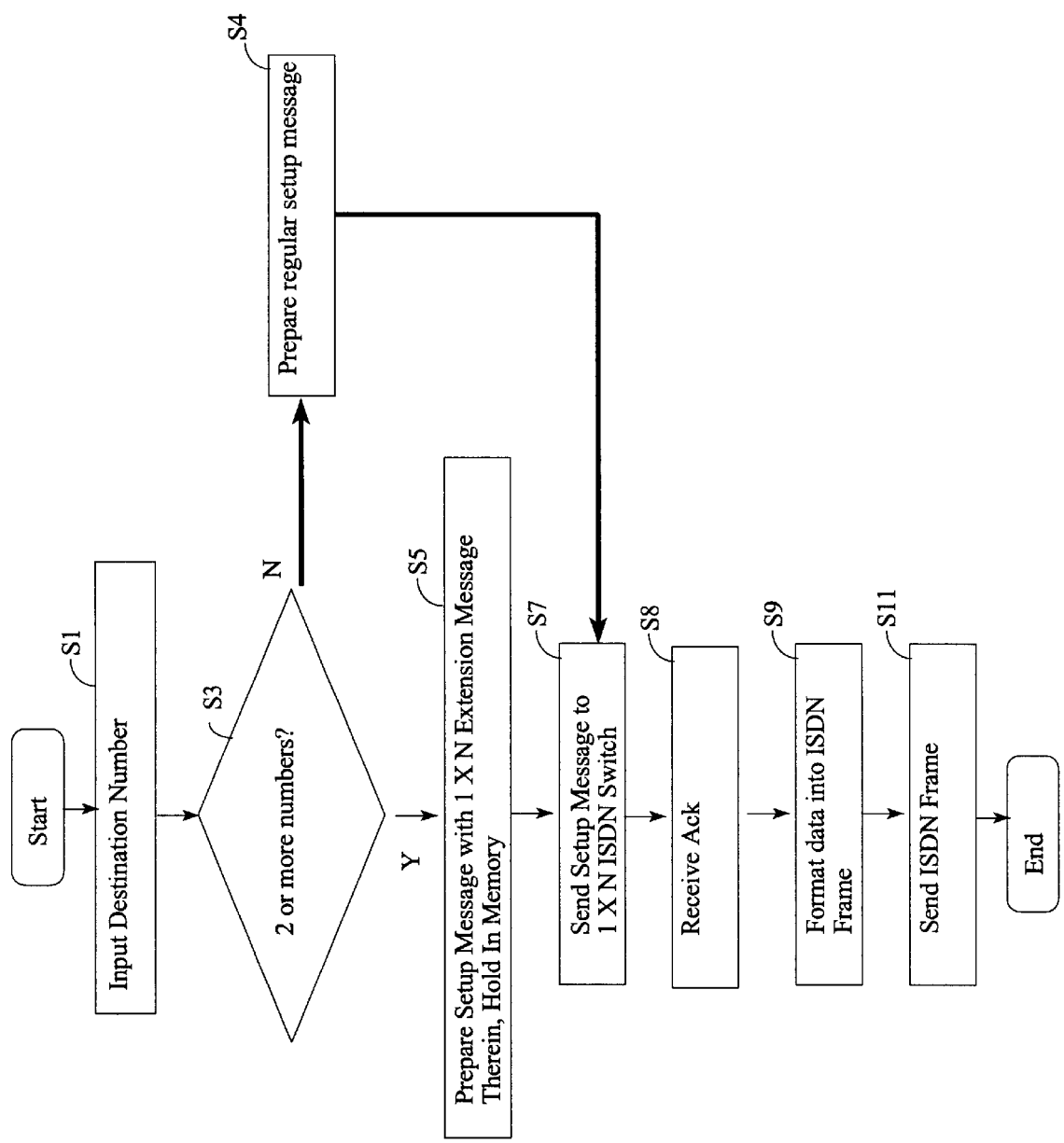
FIG. 11 is a flowchart of a method for initiating a 1×N communication session according to the present invention.

FIG. 11 is a flowchart of a process implemented at the source terminal 100 for preparing and sending the 1×N extension message. The process begins in step S1, where an operator inputs respective destination numbers to be sent to the different intended destination facilities 2A–2N. The process then proceeds to step S3 when an inquiry is made, regarding whether a user responds affirmatively or negatively to a prompt inquiring whether the user will input two or more numbers. If the response to the inquiry in step S3 is negative, the process proceeds to step S4, where the source terminal 100 prepares a conventional setup message, with one addressee. The process subsequently proceeds to step S7 as will be described. However, if the response to the inquiry in step S3 is affirmative, the process proceeds to step S5 where the 1×N extension message is prepared as part of a setup message and held in memory.

The process then proceeds to step S7 where the setup message is sent to a 1×N ISDN switch, or other switch, depending on the protocol used. Subsequently, the source terminal 100 receives an acknowledgment, or status message, in step S8, that the processor 24 in the 1×N ISDN switch 220 is able to receive the data message, corresponding with the ISDN extension message. Once the acknowledgment is received, the data is formatted into an ISDN data frame(s) message, or other format in step S9 and subsequently sent to the 1×N ISDN switch 220 in step S11. As part of step S11, the data message is distributed on N different links to the destination facilities 2A–2N, which were previously identified in the 1×N extension message. Then, the process ends.

Figure 12:
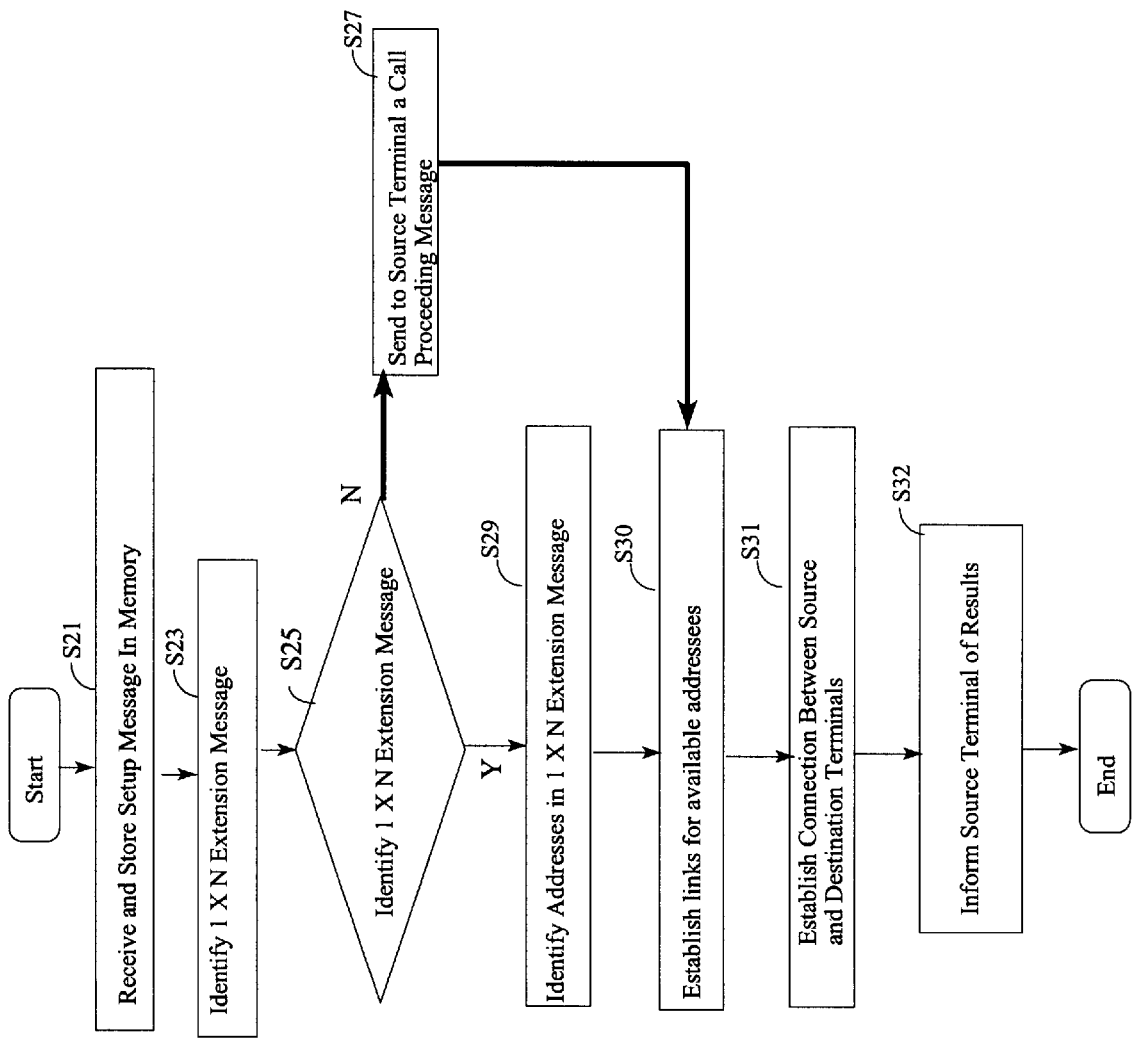
FIG. 12 is a flowchart of a process implemented in the 1×N switch for identifying and coordinating the 1×N communication session according to the present invention.

FIG. 12 is a flowchart, describing how the 1×N ISDN switch implements the 1×N extension message routing and coordination. The process begins in step S21 where a setup message is received and stored in memory, as sent from the source terminal 100. The process then proceeds to step S23 here the 1×N extension mechanism 106 in the ISDN switch 220 identifies whether the received message includes a 1×N extension message. The process then proceeds to step S25, where an inquiry is made regarding whether the extension message is present as previously identified in step S23. If the response to the inquiry in step S25 is negative, the process proceeds to step S27, where the processor 24 informs the source terminal that a call proceeding message is included and subsequently the process proceeds to step S30 as will be discussed herein. If the inquiry in step S25 is affirmative, the process proceeds to step S29 where the 1×N extension mechanism 106 identifies the respective addresses in the 1×N extension setup message. Subsequently the process proceeds to step S30, where the respective switching modules 28A–28N confirm respective communication links 17–17N are available. The process then proceeds to step S31, where the "1×N" communication link is established between the source terminal 100 and the available destination facilities 2A–2N by way of the 1×N ISDN switch. This 1×N communication link is a virtual link in the context that the processor 24, or the switch modules, holds at least a portion of the data message while simultaneously routing the data message to the respective destination facilities 2A–2N, perhaps at different data rates. Alternatively, the processor 24 need not hold any of the data message when the data message is communicated from the source terminal to the destination facilities 2A–2N at a common data rate. The process then proceeds to step S32, informing the source terminal that the data message has been delivered successfully to all of the intended destination facilities, or a subset of the destination facilities 2A–2N, if a communication error occurred at one or more of the destination facilities. Subsequently the process ends.

The mechanisms and processes set forth in the present description may be implemented using conventional general purpose microprocessors programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus in a digital network system, comprising:
   a source terminal, having,
      a source processor, configured to execute a source terminal program that forms a setup message having a 1×N extension message contained therein and configured to include a 1×N extension message indicator in the 1×N extension message,
      a source memory accessible to the source processor and configured to hold the source terminal program and the 1×N extension message indicator for inclusion in said 1×N extension message, and
      a source terminal interface configured to be coupled to a 1×N network switch, said 1×N network switch having a 1×N extension mechanism configured to detect a presence of said 1×N extension message indicator, configured to establish communications with N destination facilities identified in said 1×N extension message when said 1×N extension message indicator is detected, and configured to send a data message to said N destination facilities, said data message being provided by said source terminal, wherein
   said 1×N extension message includes addresses that identify the N destination facilities so as to enable said 1×N network switch to route the data message to said N destination facilities.

2. The apparatus of claim 1, further comprising: said 1×N network switch, said 1×N network switch being configured to send the data message as one of an ISDN message, frame relay formatted message and asynchronous transfer mode formatted message.

3. The apparatus of claim 1, further comprising:
   said 1×N network switch comprising,
      a first switching module coupled to said source terminal interface and configured to receive said network setup message and said 1×N extension message from said source terminal,
      a second switching module having multiple switch module components configured to communicate with a corresponding number of the N destination facilities,
      a switch processor, and
      a switch memory accessible to said switch processor, said switch memory configured to hold a 1×N extension program that when executed by said switch processor identifies respective addresses of the N destination facilities identified in the 1×N extension message, and forms respective query signals sent to the N destination facilities identified in the 1×N extension message inquiring whether respective communication links are available for receiving the data message.

4. The apparatus of claim 3, wherein:
   the 1×N extension mechanism is implemented as a computer-based process.

5. The apparatus of claim 4, further comprising:
   at least one of said N destination facilities, each of said N destination facilities comprising:
      a destination terminal processor,
      a destination terminal memory accessible to said destination terminal processor configured to hold an availability indicator value indicative of whether the destination terminal has available a communication line for receiving said data message, and
      a destination terminal interface coupled to one of the multiple switch module components and configured to receive at least one of said query signals therefrom, wherein
   said processor includes a response mechanism configured to send a reply message to said 1×N network switch in response to receiving said at least one of said query signals, said reply message containing said availability indicator value.

6. The apparatus of claim 1, wherein:
said source terminal interface being configured to send said 1×N extension message to said 1×N network switch over an ISDN D channel.

7. An apparatus in a network computer-based system, comprising:
a 1×N network switch having,
a first switch interface configured to connect a source terminal to a first switching module, wherein the first switching module is configured to receive a setup message containing a 1×N extension message sent from said source terminal, said 1×N extension message including a 1×N extension message indicator,
a second switch interface configured to connect multiple switching module components to N destination facilities,
a switch processor, configured to execute a 1×N extension mechanism program that detects a presence of the 1×N extension message indicator in the 1×N extension message, and when the 1×N extension message indicator is detected, determines if the N destination facilities have an available communication link for receiving a data message sent from the source terminal, and sends the data message to destination facilities determined to have an available communication link, wherein the first switching module and the multiple switching module components are connected to the switch processor, and
a switch memory accessible to said switch processor, said switch memory configured to hold the 1×N extension mechanism program.

8. The apparatus of claim 7, wherein:
said first switch interface being configured to receive said extension message over an ISDN D channel.

9. The apparatus of claim 7, wherein:
said 1×N network switch being configured to send the data message as one of an ISDN message, frame relay formatted message and asynchronous transfer mode formatted message.

10. An apparatus in a digital network switch computer-based system, comprising:
a source terminal, having
a source processor means for executing a source terminal program,
means for holding the source terminal program and a 1×N extension message indicator for inclusion in a 1×N extension message,
means for forming a setup message with the 1×N extension message contained therein and including said 1×N extension message indicator in said 1×N extension message, and
source terminal interface means for sending said setup message with said 1×N extension message to a 1×N network switch, wherein
a 1×N extension mechanism detects a presence of the 1×N extension message indicator and, when the 1×N extension message indicator is detected, said 1×N extension message informs said 1×N network switch of a request by the source terminal to establish separate communication links between the 1×N network switch and multiple destination facilities for simultaneously sending a common data message to the multiple destination facilities.

11. The apparatus of claim 10, wherein:
said means for forming a setup message includes means for forming said 1×N extension message to include at least one of an ISDN data structure, frame relay data structure and ATM data structure that includes a control field indicative of a presence of the 1×N extension message.

12. The apparatus of claim 10, further comprising:
the 1×N network switch, having
first switch interface means coupled to said source terminal interface means for receiving said setup message with the 1×N extension message from said source terminal,
second switch interface means coupled to said multiple destination facilities,
a switch processor,
switch memory means accessible to said switch processor, said switch memory means for holding a 1×N extension mechanism program that when executed by said switch processor forms query signals sent to respective of said multiple destination facilities via said second switch interface means, wherein
said switch processor comprises means for executing said 1×N extension mechanism program so as to identify whether respective of said multiple destination facilities can accommodate receiving the common data message via the second switch interface means.

13. A device in a digital network computer-based system, comprising:
a 1×N network switch comprising,
first switch interface means for receiving a setup message containing a 1×N extension message from a source terminal, said 1×N extension message including a 1×N extension message indicator,
a second switch interface means for communicating with multiple destination facilities,
a switch processor means for executing a 1×N extension mechanism program that detects whether the 1×N extension message indicator is present in the 1×N extension message,
means for holding a 1×N extension mechanism program,
means for forming and sending query signals to N destination facilities via said second switch interface means, and
means for receiving reply messages from said N destination facilities indicative of whether N communication links are available for receiving a data message from said source terminal.

14. A method for sending a data message via a 1×N switch in a digital network computer-based system, comprising:
executing a source terminal program in a source processor;
holding the source terminal program in memory and holding a 1×N extension message indicator in memory for inclusion in a 1×N extension message;
detecting when at least two destination numbers are indicated and, when at least two destination numbers are detected, forming a setup message with the 1×N extension message contained therein and including said 1×N extension message indicator in said 1×N extension message;
sending said 1×N extension message to the 1×N switch; and
detecting a presence of the 1×N extension message indicator and, when the 1×N extension message indicator is detected, informing said 1×N switch of a request by the source terminal to determine whether multiple destination facilities have communication lines available thereto, and simultaneously sending a data message from the source terminal to the multiple destination facilities with available communication lines.

15. The method of claim 14, wherein:

said forming step comprises forming said 1×N extension message to include a control field configured to hold the 1×N extension message indicator.

16. The method of claim 14, further comprising the steps of:

receiving at the 1×N switch said setup message with said 1×N extension message from said source terminal; and holding in said 1×N switch a 1×N extension mechanism that when executed by said switch processor performs the steps of forming a query signal, sending the query signal to respective of said multiple destination facilities via said second switch interface, and identifying whether respective of said multiple destination facilities have at least one of the communication links available for receiving the data message by receiving responses to said query signal.

17. A method of sending a data message to N destination facilities via a 1×N switch in a digital network computer-based system, comprising the steps of:

receiving a setup message at the 1×N switch, said setup message containing a 1×N extension message, having a 1×N extension message indicator sent from a source terminal;

executing a 1×N extension mechanism program on a switch processor in said 1×N switch that detects a presence of the 1×N extension message indicator i n the 1×N extension message;

holding the 1×N extension mechanism program in memory;

forming and sending query signals to said N destination facilities when said 1×N extension message indicator is detected;

receiving reply messages from said N destination facilities to determine whether said N destination facilities have communication links available thereto for receiving the data message from the source terminal; and sending the data message to destination facilities having communication links available thereto.

18. The apparatus of claim 1, wherein the 1×N extension mechanism further comprises:

a message receiver configured to receive the 1×N message from the source terminal without modification by an intervening switch; and a 1×N communication coordination mechanism configured to send query messages to switching module components that correspond with the N destination facilities.

19. The apparatus of claim 7, wherein the 1×N extension mechanism further comprises:

a message receiver configured to receive the 1×N message from the source terminal without modification by an intervening switch; and a 1×N communication coordination mechanism configured to send query messages to switching module components that correspond with the N destination facilities.

20. The apparatus of claim 10, wherein the 1×N extension mechanism further comprises:

a message receiver configured to receive the 1×N message from the source terminal without modification by an intervening switch; and a 1×N communication coordination mechanism configured to send query messages to switching module components that correspond with the N destination facilities.

21. The apparatus of claim 13, wherein the 1×N extension mechanism program further comprises:

a message receiver configured to receive the 1×N message from the source terminal without modification by an intervening switch; and a 1×N communication coordination mechanism configured to send query messages to switching module components that correspond with the N destination facilities.

22. The method of claim 14, further including the steps of:

receive the 1×N message from the source terminal without modification by an intervening switch; and sending query messages to switching module components that correspond with the N destination facilities.

23. The method of claim 17, further including the steps of:

receive the 1×N message from the source terminal without modification by an intervening switch; and sending query messages to switching module components that correspond with the N destination facilities.

\* \* \* \* \*